United States Patent [19]
Johnson et al.

[11] Patent Number: 5,746,445
[45] Date of Patent: May 5, 1998

[54] INJECTION TERMINATION FEATURE

[76] Inventors: Darrin L. Johnson, 16158 E. Glenbrook Blvd., Fountain Hills, Ariz. 85268; Bradley D. Harris, 761 Southhampton Ct., Farmington, Utah 84025

[21] Appl. No.: 770,380

[22] Filed: Dec. 3, 1996

[51] Int. Cl.⁶ .................................................. B60R 21/26
[52] U.S. Cl. ........................................ 280/741; 102/530
[58] Field of Search .................................. 280/741, 736, 280/737; 102/530, 531

[56] References Cited

U.S. PATENT DOCUMENTS

| | | | |
|---|---|---|---|
| 3,618,974 | 11/1971 | Chute | 280/150 AB |
| 3,689,105 | 9/1972 | Matsui et al. | 280/150 AB |
| 3,690,255 | 9/1972 | Vass et al. | 102/39 |
| 3,960,390 | 6/1976 | Goetz | 280/731 |
| 4,326,377 | 4/1982 | Jaqua | 60/247 |
| 4,805,399 | 2/1989 | McKevitt | 60/200.1 |
| 5,060,973 | 10/1991 | Giovanetti | 280/736 |
| 5,330,730 | 7/1994 | Brede et al. | 280/737 |
| 5,345,876 | 9/1994 | Rose et al. | 102/531 |
| 5,487,561 | 1/1996 | Mandzy et al. | 280/741 |
| 5,639,117 | 6/1997 | Mandzy et al. | 280/741 |
| 5,669,631 | 9/1997 | Johnson et al. | 280/741 |

Primary Examiner—Paul N. Dickson

[57] ABSTRACT

In an inflator of a vehicle safety restraint system utilizing liquid propellant as the inflation gas generator, decomposition of residual liquid propellant within the inflator produces undesirable gases which can result in unacceptable inflator effluent. The injection termination features of the present invention are formed onto an encapsulation or plug of a regenerative piston inflator. Upon completion of the piston stroke, the injection termination feature makes contact with the injection ports and plugs the injection ports to prevent combustion and decomposition reactions from propagating through the piston.

20 Claims, 5 Drawing Sheets

INJECTION TERMINATION FEATURE

This application is related to copending applications Ser. No. 08/770,382, entitled "Anti-Rupture Method For Liquid Propellant Gas Inflator"; Ser. No. 08/760,011, entitled "Regenerative Piston Liquid Propellant Rocket Motor"; Ser. No. 08/781,760, entitled "Liquid Propellant Inflator Having a Crowned Encapsulation and a Pre-formed Regenerative Piston Chamber"; Ser. No. 08/768,146, entitled "Regenerative Piston Engine For Combustion of Liquid Monopropellant"; Ser. No. 08/759,995, entitled "Regenerative Monopropellant Airbag Inflator", and Ser. No. 08/802,457, (entitled "Adaptive Regenerative Inflator", all assigned to the assignee to the present invention.

BACKGROUND OF THE INVENTION

1. Field of the Invention

The present invention relates to an injection termination feature for an inflator of a vehicle safety restraint system, and more particularly, to an injection termination feature which prevents combustion and decomposition reactions of residual liquid propellant from propagating through a regenerative piston of the inflator.

2. Description of the Related Art

It is known in the prior art to employ an inflatable vehicle safety restraint system for protecting a passenger of an automobile. Such restraint systems encompass a reaction canister which houses a gas generator or inflator, and an air bag in an uninflated condition. For actuating the inflator, an inflator initiator or squib, which comprises an electro-explosive device, starts the material of the inflator burning. The inflator initiator is connected to a collision sensor that is positioned adjacent the initiator or at a remote location in the vehicle.

Numerous different types of inflators have been disclosed in the prior art for expanding an inflatable air bag. One type of inflator utilizes a quantity of high pressure gas stored in a storage cylinder or body, which is selectively released to inflate the air bag. Another type of inflator derives the gas source from a combustible gas generating material, which, upon ignition, generates a quantity of hot gas for inflating the air bag. In still another type, the inflator includes both stored compressed gas and gas generating material for inflating the air bag.

A drawback to an airbag which utilizes compressed gas, is that the gas may leak out over long periods of time. If the gas pressure of the bottle falls below a predetermined level due to an undetected gas leak, the airbag effectiveness would degrade and the system will not operate properly. Solid propellants generate toxic by-products and particulate which must be filtered from the gas. The filters necessary to remove these toxic by-products increase the size and weight of the inflators increasing manufacturing costs.

Still another type of inflator is one which utilizes a liquid propellant for producing the inflation gas. Liquid propellant does not require pressurized storage. Another advantage is that the liquid propellant is favorable to the environment and the gas it generates does not need to be filtered prior to release. However, the choice of materials for containing the liquid propellant is limited due to the corrosive nature of the propellant. Also, liquid propellant is sensitive to contamination.

U.S. Pat. No. 5,060,973 discloses an inflator for an occupant restraint safety apparatus which utilizes a liquid propellant for generating the air bag inflation gas. U.S. Pat. No. 5,487,561 discloses an inflator also utilizing a liquid propellant, wherein a piston separates a combustion chamber from a reservoir of the liquid propellant. The piston is driven by combustion to deliver the liquid propellant through ports in the piston head into the combustion chamber.

A disadvantage with inflators utilizing liquid propellant is the tendency for a portion of the liquid to remain within the inflator liquid propellant reservoir after completion of ignition. Due to low pressure conditions, the residual propellant decomposes into undesirable gases (mostly NOx), which can result in unacceptable inflator effluent. Moreover, if the flame or other significant heat is allowed to pass through the injection ports of a piston, as disclosed in U.S. Pat. No. 5,487,561, decomposition of residual propellant in the storage area of the inflator is initiated.

SUMMARY OF THE INVENTION

An object of the present invention is to provide an inflator of a vehicle safety restraint system utilizing a liquid propellant gas generator.

Another object of the present invention is to provide a regenerative piston inflator including an injection termination feature, wherein upon completion of the piston stroke, the injection termination feature makes contact with the injection ports of the piston and plugs the injection ports to prevent combustion and decomposition reactions of excess liquid propellant from propagating through the piston.

In accomplishing these and other objectives of the present invention, there is provided an inflator of a vehicle safety restraint system comprising a housing including a reservoir of liquid propellant. A combustion chamber is disposed in the housing in communication with the liquid propellant reservoir. Regenerative piston means separate the liquid propellant reservoir and the combustion chamber. The piston means include a plurality of injection ports for delivering the liquid propellant to the combustion chamber in a controlled manner. Injection termination means are disposed in the housing. Upon completion of the stroke of the piston means, the injection termination means seals the injection ports of the piston means for preventing the combustion and decomposition reactions of any remaining liquid propellant from propagating through the piston.

The injection termination means may comprise a button of material molded integrally or adhered to an encapsulation means or a cap disposed in the encapsulation means. In another embodiment the injection termination means comprises a ring of material molded with or adhered to the encapsulation means. The ring fitting within a groove on a bottom portion of a head of the piston means.

The injection termination means may also comprises a chamber of non-combustible material located within the encapsulation means. The chamber is separated from the liquid propellant reservoir by a frangible membrane, wherein upon completion of the stroke of the piston, the piston head fractures the membrane and the non-combustible material flows into and seals the injection ports of piston bead.

Other features and advantages of the present invention will become apparent from the following description of the invention which refers to the accompanying drawings.

DETAILED DESCRIPTION OF THE PREFERRED EMBODIMENTS

Figure 1:
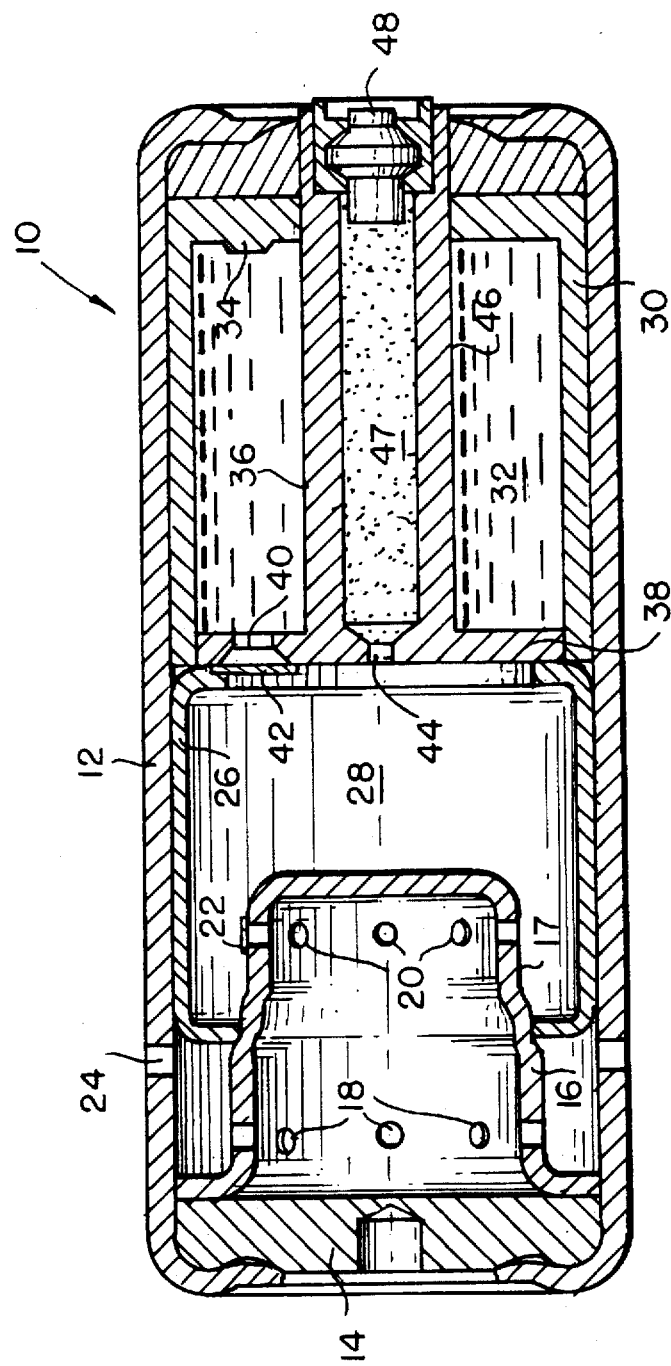
FIG. 1 is a cross-section of an inflator of a vehicle safety restraint system according to one embodiment of the present invention.

Referring to FIG. 1, an inflator for deploying an air bag (not shown) of a vehicle safety restraint system is indicated by reference numeral 10. Inflator 10 includes a housing 12 made of a lightweight material, for example aluminum. Located in one end of housing 12 is a swirl tube 16 and an end cap or base stud 14 which seals that end of housing 12. Swirl tube 16 includes an upper portion 17 which is enclosed within a swirl retainer 26. Upper portion 17 includes a plurality of gas entry apertures 20.

Swirl tube 16 also includes a plurality of exit apertures 18 which communicate with exit ports 24 disposed in housing 12. As will be described further herein, generated gas enters swirl tube 16 via entry apertures 20. Once within swirl tube 16, the generated gas circulates and cools before exiting through exit apertures 18. Exit apertures 18 can be radially or tangentially cut, depending upon the mass flow and speed desired. As previously mentioned, the generated gas exits the swirl tube into the housing and then out of the inflator through exit ports 24.

Swirl retainer 26, in addition to separating apertures 18 and 20, also encloses a combustion chamber 28, which contains a suitable gas, for example, air. As will be described further herein, chamber 28 is pressurized during combustion.

As shown in the drawing figures, housing 12 is divided into combustion chamber 28 and a liquid propellant chamber or reservoir 32. Chamber 28 and reservoir 32 are separated by a regenerative piston 36 having a piston head or face 38 which is slidably received within an encapsulation cup 30. Piston head 38 includes a plurality of injection ports 40, sealed with a burst foil 42, for providing fluid communication between combustion chamber 28 and liquid propellant reservoir 32. Reservoir 32 contains a quantity of liquid propellant, for example, Han/Tean.

Encapsulation 30 can be made of a material which can withstand the corrosive effects of the liquid propellant, for example, Teflon or a plastic coated metal, thus protecting housing 12 from direct contact with the liquid propellant. Piston head 38 is received within encapsulation 30 tightly enough to prevent seepage of the liquid propellant from the reservoir, but with head 38 still able to slide within encapsulation 30. If necessary sealing means, for example, an o-ring or gasket, can also be provided to prevent leakage.

Piston 36 also includes a stem 46 which extends through reservoir 32. To prevent corrosion of piston 36 the stem 46 can be coated with a lining 54, see FIG. 3. Stem 46 is hollow to accommodate ignitor material 47. Piston head 38 includes a central bore 44 at one end between ignitor material 47 and combustion chamber 32. The opposite end of stem 46 includes a squib 48 mounted therein. It should be understood that other structural details and operation of inflator 10, do not form a part of the present invention and will not be described further herein.

Figure 2:
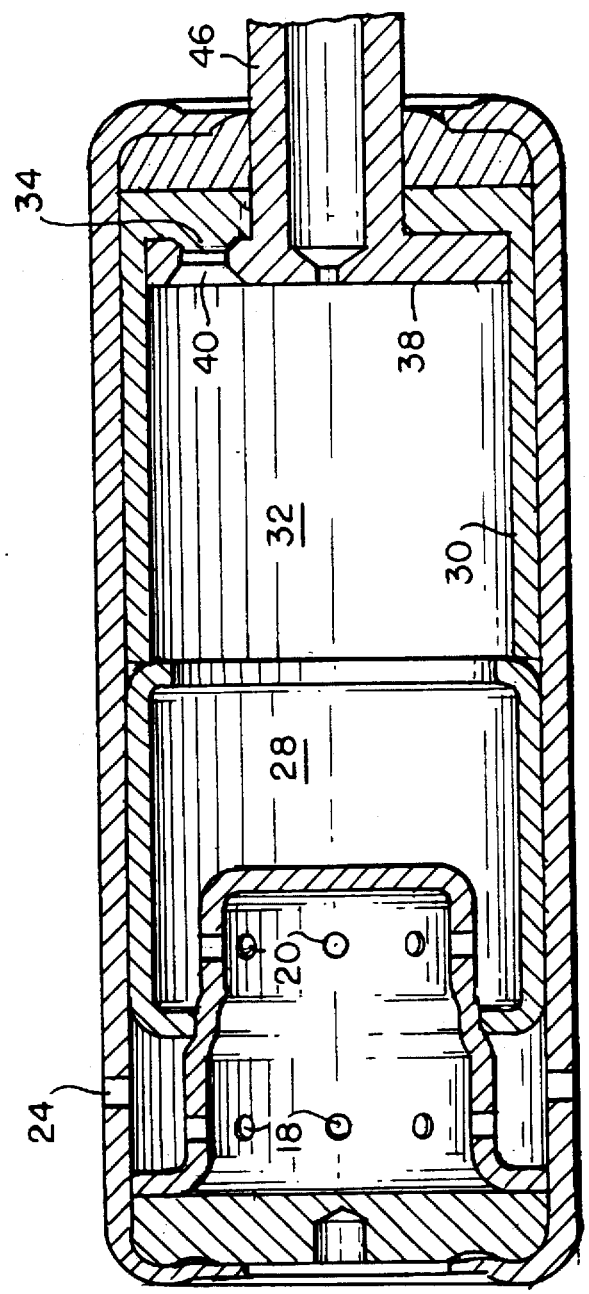
FIG. 2 is a cross-section of the inflator of FIG. 1 after completion of the firing of the inflator.

Referring to FIGS. 1 and 2, upon firing of squib 48, material 47 is ignited and the gas exits port 44 causing a combustion reaction in chamber 28. The increased pressure in chamber 28 bursts foil 42 covering the injection ports 40 and drives the piston head against the liquid propellant and an initial quantity of the liquid propellant is delivered to the combustion chamber 28 through ports 40. This initial quantity of liquid propellant combusts causing the pressure within chamber 28 to increase further. The energy generated by the combustion of the initial quantity is used to drive the piston further into the liquid propellant reservoir and additional liquid propellant is injected into the combustion chamber. Upon bursting of foil 22, the generated gas enters swirl tube 16 via entry apertures 20 and exits through apertures 18 and ports 24 of housing 12.

As the piston is driven further against the liquid propellant, more gas is generated, until as shown in FIG. 2, mostly all of the liquid propellant is displaced. This regenerative cycle provides controlled burning of the liquid propellant, and prevents quick burning of the propellant which can result in explosion of the inflator.

Although the majority of the liquid propellant is displaced by the piston, residual propellant still remains within reservoir 32. If significant heat is allowed to pass through the piston injection ports 40 initiation of the decomposition of the residual propellant can occur. Due to the low pressure conditions, the residual propellant decomposes into undesirable gases (mostly NOx), which can result in unacceptable inflator effluent.

The present invention relates to an injection termination feature formed onto the encapsulation or plug of the regenerative piston for contacting and sealing the injection ports of the piston head for preventing combustion and/or decomposition reactions from propagating through the injection ports.

Figure 3:
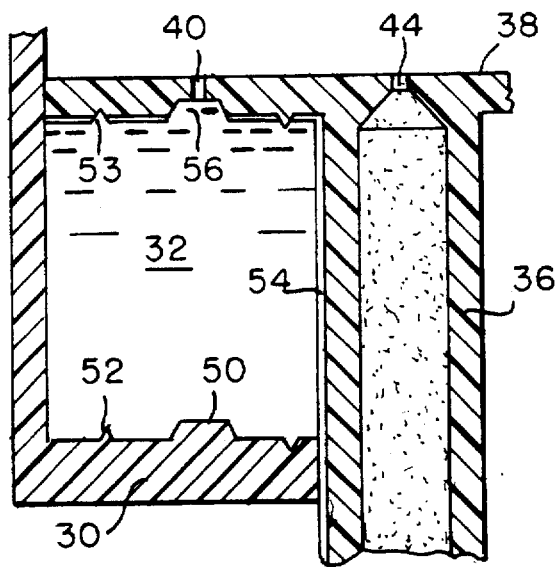
FIG. 3 is an enlarged partial cross-section of the piston, liquid propellant cavity, and injection termination feature of FIG. 1.

The embodiment of FIGS. 1–3 discloses an injection termination feature 34 located on encapsulation 30. The injection termination feature 34 can be a button of material 50 molded with the encapsulation during molding thereof or separately adhered to encapsulation 30 by known adhesive means. As shown in FIG. 2, upon completion of the piston stroke the button 50 fits within an aperture or groove 56 surrounding injection port 40 to plug the injection ports to prevent propagation therethrough.

Referring to FIG. 3, in order to aid alignment of button 50 within groove 56, alignment indents and protrusions 52, 53 can be formed on both encapsulation 30 and piston head 38. Moreover, as shown, piston head 38 can also include lining 54 to prevent corrosion of the piston head due to the liquid propellant.

Figure 4:
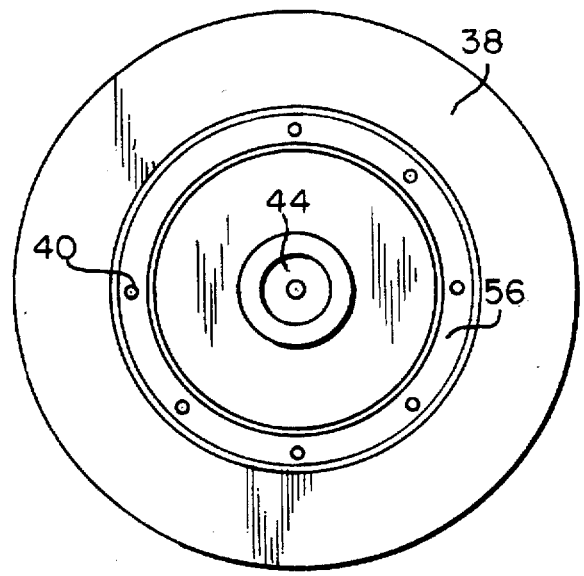
FIG. 4 is a bottom view of the piston head of FIG. 1.
Figure 5:
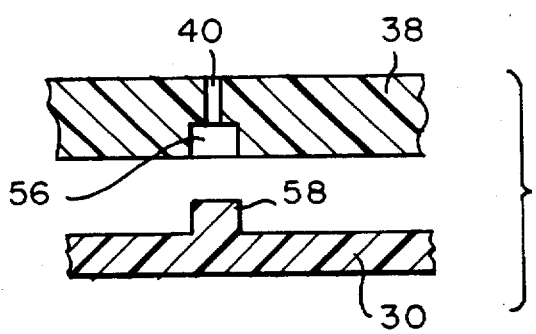
FIG. 5 is an enlarged cross-section of the fluid ports of the piston head and a injection termination ring according to a second embodiment of the present invention.

As shown in FIG. 4, piston head 38 includes a plurality of injection ports 40 located within groove 56. The embodiment of FIG. 5 discloses a ring 58 which can be either integrally molded with encapsulation 30 or just adhered thereto. Upon completion of the piston stroke, ring 58 fits within groove 56 to plug injection ports 40.

Figure 6:
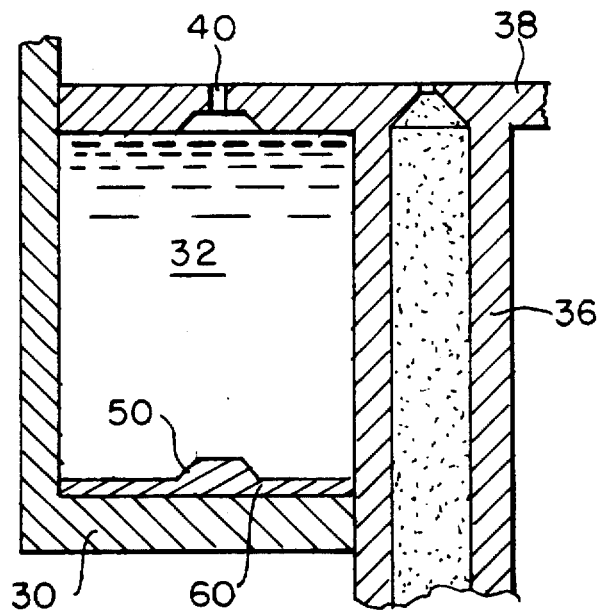
FIG. 6 is an enlarged cross-section of an inflator incorporating an injection termination washer according to a third embodiment of the present invention.

The embodiment of FIG. 6 discloses a washer 60 located within encapsulation 30. Washer 60, for example, made of silicone, can be adhered to encapsulation 30 by known means. Washer 60 includes the injection terminator 50, which operates in the same manner as the embodiment of FIGS. 1–3.

Figure 7:
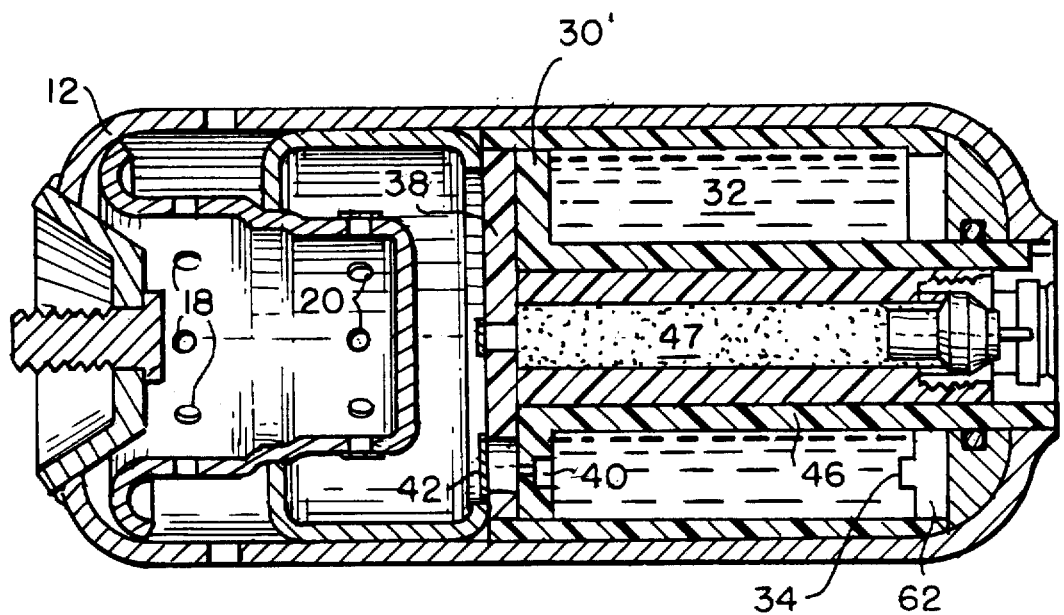
FIG. 7 is a cross-section of an inflator including a cap which incorporates an injection termination feature according to a fourth embodiment of the present invention.

The inflator of FIG. 7 includes a cap 62 sealingly disposed within an encapsulation 30' and supported by a base 63 of the inflator housing 12. Encapsulation 30' is generally tube shaped and made of a non-corrosive material. Cap 62, made of a material which is chemically compatible with the liquid propellant, for example, Teflon or silicone, can be attached to the ends of encapsulation 30' by welding, for example, by Teflon welds. The cap 62 includes injection termination button 50, which can be either formed integrally with the cap, or adhered thereto as a separate portion of sealing material. As with the embodiments of FIGS. 1–6, the cap 62 can include an injection terminating ring, or silicone washer formed with or adhered thereto.

Figure 8:
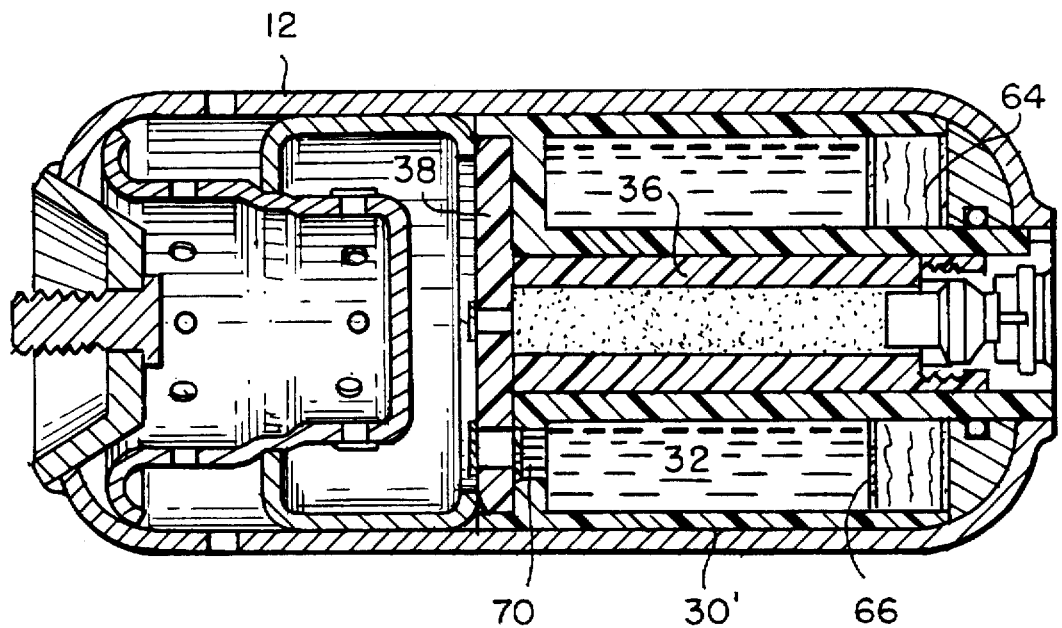
FIG. 8 is a cross-section of an inflator of a vehicle safety restraint system according to another embodiment of the present invention.
Figure 9:
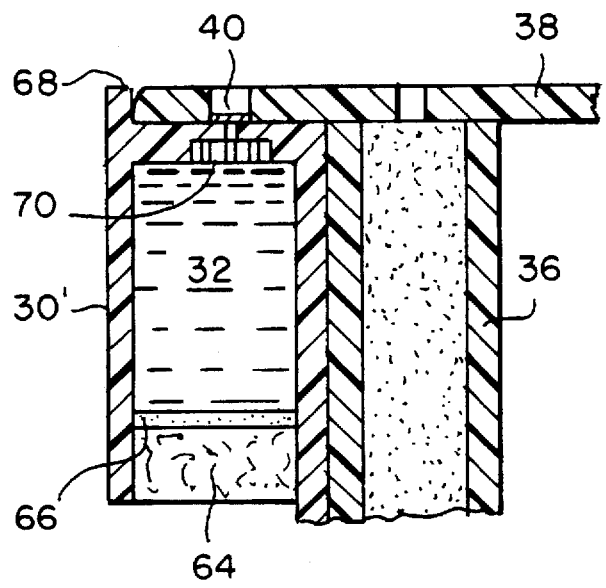
FIG. 9 is an enlarged cross-section of the injection termination feature of FIG. 8.

FIGS. 8–9 disclose still another embodiment of the present invention. In this embodiment, the injection termination feature comprises a chamber 64 containing a quantity of non-combustible material, for example, water or grease. Chamber 64 is located at a bottom portion of the liquid propellant reservoir 32 and separated therefrom by a frangible membrane 66. Membrane 66 can be in the form of a bladder which contains the water or grease. The bladder is placed within encapsulation 30'. Alternatively, the membrane can be placed on top of the liquid propellant and the grease or water filled in behind, preventing the propellant and water or grease from mixing. Due to the high pressure the rigid membrane will behave as if it was soft.

As shown in FIG. 9, the piston head 38, as it is driven into the liquid propellant reservoir 32 as described above, will break the encapsulation 30' along score lines 68. As the piston stroke continues to move into reservoir 32, the piston head and encapsulation will eventually burst membrane 66, allowing the non-combustible material 64 from injector button 70 to flow into injection ports 40 ceasing combustion at the end of the piston stroke.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An inflator of a vehicle safety restraint system, comprising:
   a housing, the housing including a reservoir of liquid propellant;
   a combustion chamber disposed in the housing in communication with the liquid propellant reservoir;
   regenerative piston means for separating the liquid propellant reservoir and the combustion chamber, the piston means including a plurality of injection ports for delivering the liquid propellant to the combustion chamber in a controlled manner; and
   injection termination means disposed in the housing, wherein upon completion of a stroke of the piston means, the injection termination means seals the injection ports of the piston means for preventing combustion and decomposition reactions of any residual liquid propellant from propagating through the piston means.

2. The inflator of claim 1, further comprising means for encapsulating the liquid propellant reservoir within the housing.

3. The inflator of claim 2, wherein the piston means comprises a piston including a head separating the combustion chamber from the liquid propellant reservoir and a piston stem extending through the encapsulation means, the piston being movably disposed within the encapsulation means.

4. The inflator of claim 3, further comprising a quantity of ignitor material disposed within the stem of the piston and initiating means disposed within the housing for igniting the material, wherein upon ignition the piston head is driven into the liquid propellant reservoir and the liquid propellant flows through the injection ports disposed in the piston head into the combustion chamber.

5. The inflator of claim 3, wherein the encapsulation means comprises an encapsulation cup contacting the housing, the encapsulation cup being molded from a non-corrosive material.

6. The inflator of claim 5, wherein the injection termination means is located within the encapsulation cup.

7. The inflator of claim 6, wherein the injection termination means comprises a plurality of buttons of material molded integrally with the encapsulation cup, wherein upon completion of the stroke of the piston the plurality of buttons seal the plurality of injection ports.

8. The inflator of claim 6, wherein the injection termination means comprises a plurality of buttons of material adhered to the encapsulation cup, wherein upon completion of the stroke of the piston the plurality of buttons seal the plurality of injection ports.

9. The inflator of claim 6, wherein the piston head includes a circular groove in a bottom portion thereof, the plurality of injection ports being disposed in the groove.

10. The inflator of claim 9, wherein the injection termination means comprises a ring of material located on the encapsulation cup, wherein upon completion of the stroke of the piston, the ring fits within the groove of the piston head to seal the plurality of injection ports.

11. The inflator of claim 6, wherein the injection termination means comprises a washer of material disposed within the encapsulation cup, wherein upon completion of the stroke of the piston, the washer seals the plurality of injection ports.

12. The inflator of claim 3, wherein the encapsulation means comprises an encapsulation tube of non-corrosive material contacting the housing.

13. The inflator of claim 12, wherein the encapsulation tube includes a cap sealing an end thereof.

14. The inflator of claim 13, wherein the injection termination means comprises a plurality of buttons of material molded integrally with the cap of the encapsulation tube, wherein upon completion of the stroke of the piston the plurality of buttons seal the plurality of injection ports in the piston head.

15. The inflator of claim 13, wherein the injection termination means comprises a plurality of buttons of material adhered to the cap of the encapsulation tube, wherein upon completion of the stroke of the piston the plurality of buttons seal the plurality of injection ports of the piston head.

16. The inflator of claim 13, wherein the piston head includes a circular groove in a bottom portion thereof, the plurality of injection ports being disposed in the groove.

17. The inflator of claim 16, wherein the injection termination means comprises a ring of material located on the cap of the encapsulation tube, wherein upon completion of the stroke of the piston, the ring fits within the groove of the piston head to seal the plurality of injection ports of the piston head.

18. The inflator of claim 6, wherein the injection termination means comprises a chamber of non-combustible material located within the encapsulation cup, the chamber being separated from the liquid propellant reservoir by a frangible membrane, wherein upon completion of the stroke of the piston, the piston head fractures the membrane and the non-combustible material flows into and seals the plurality of injection ports of the piston head.

19. A method of terminating injection of a liquid propellant in a regenerative piston inflator of a vehicle safety restraint system, comprising the steps of:

movably positioning a piston within a housing of the inflator, the housing including a reservoir of liquid propellant and a combustion chamber separated from the liquid propellant reservoir by a head of the piston;

driving the piston head into the liquid propellant reservoir, the piston head including a plurality of injection ports in fluid communication with the liquid propellant reservoir, the liquid propellant flowing through the injection ports into the combustion chamber;

combusting the liquid propellant in the combustion chamber;

continuing to drive the piston into the liquid propellant reservoir; and sealing the injection ports of the piston head by injection termination means disposed in the housing to prevent combustion and decomposition reactions of any remaining liquid propellant from propagating through the injection ports of the piston.

20. The method of claim 19, wherein the injection termination means comprises a quantity of material disposed within an encapsulation means enclosing the liquid propellant, and the step of sealing the injection ports of the piston head comprises sealing the injection ports with the quantity of material.

* * * * *